Patented Jan. 26, 1943

2,309,576

UNITED STATES PATENT OFFICE 2,309,576

PYROLYSIS OF UNSATURATED ETHERS

Willard B. Converse, Berkeley, Calif., assignor to Shell Development Company, San Francisco, Calif., a corporation of Delaware No Drawing. Application March 10, 1941,
Serial No. 382,575

13 Claims. (Cl. 260—601)

This invention relates to the pyrolysis of unsaturated primary and secondary ethers to the corresponding unsaturated aldehydes and ketones, and more particularly pertains to the manufacture of unsaturated aldehydes and ketones by treating symmetrical and/or unsymmetrical, primary and/or secondary ethers containing an olefinic linkage in non-vinyl position with respect to the ether oxygen atom.

In one of its embodiments this invention is directed to the production of unsaturated aldehydes or ketones from unsaturated ethers wherein at least one of the radicals is attached to the ether oxygen atom by means of a methylene or methylidyne radical, respectively, and wherein such radical contains an olefinic linkage in allyl position with respect to the ether oxygen atom. When these allyl-type unsaturated ethers are of primary nature, i. e., when the unsaturated radical containing the olefinic linkage in allyl position to the ether oxygen atom is attached thereto via a methylene group, the oxygenated (carbonylic) compound produced by treatment according to the present process comprises or contains unsaturated allyl-type aldehydes. On the other hand, a treatment of the above-defined class of unsaturated ethers which are of secondary character results in the formation of allyl-type unsaturated ketones. Preferably, both radicals attached to the ether oxygen atom should contain an olefinic linkage in allyl position with respect to the ether oxygen atom. For example, when it is desired to produce unsaturated aldehydes of the general formula

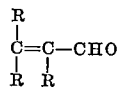

wherein each R represents a substituent selected from the group consisting of the hydrogen atom and substituted and unsubstituted hydrocarbon radicals, it is advantageous to treat unsaturated ethers wherein each radical is attached to the ether oxygen atom by means of a methylene group and wherein each of said radicals contains an olefinic linkage in allyl position with respect to the ether oxygen atom. Very high yields of unsaturated carbonyl compounds may be obtained when the unsaturated primary or secondary ethers subjected to treatment according to the present process are symmetrical with respect to the ether oxygen atom.

The following is a non-limiting, representative list of primary unsaturated ethers which may be pyrolyzed according to the process of the invention to produce acrolein or similar unsaturated aldehydes:

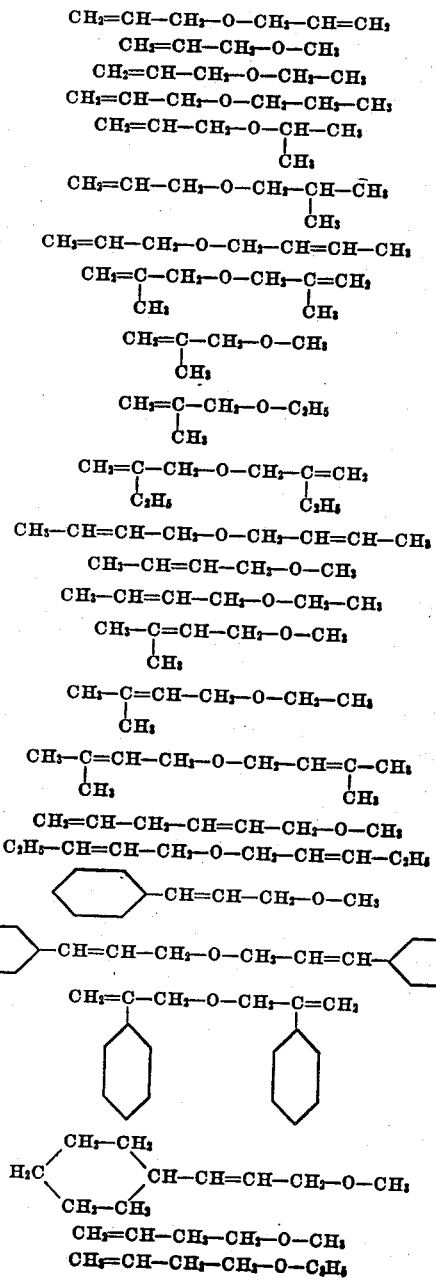

and the like and their homologues and analogues, as well as suitable substitution products. For example, one or more of the hydrogen atoms of the above unsaturated ethers may be substituted by various organic or inorganic radicals or atoms, e. g., halogens. However, when it is desired to produce unsaturated aldehydes, the unsaturated radical should be attached to the ether oxygen atom by means of a methylene group, i. e. the alkylene or substituted alkylene radical should be attached to the ether oxygen atom by means of a carbon atom carrying two hydrogen atoms thereon.

The isomers of the above and similar unsaturated ethers (which ethers are of secondary character) may also be treated according to the present process to produce unsaturated ketones. The following is a non-limiting, representative list of such secondary unsaturated ethers:

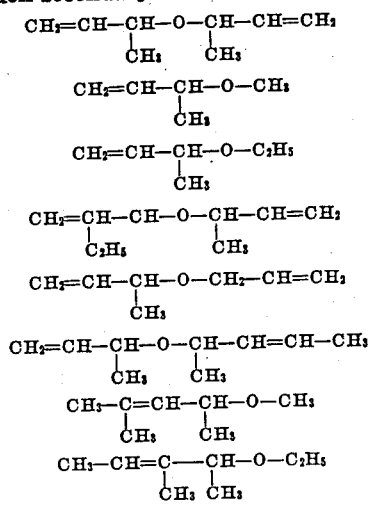

and the like and their homologues and analogues, and suitable substitution products. Instead of the alkyl derivatives, the aryl and aralkyl derivatives may be resorted to, in which case the cyclic nuclei may be heterocyclic as well as carbocyclic. In all of these non-vinyl secondary unsaturated ethers, at least one of the radicals is attached to the ether oxygen atom by means of a carbon atom carrying only one hydrogen atom, such radical containing an olefinic linkage which is in allyl position with respect to the ether oxygen atom.

Particularly suitable unsaturated ethers (whether primary, secondary or mixed ethers, i. e., those in which one of the radicals is of primary and the other of secondary character) are those wherein each radical attached to the ether oxygen atom contains a single olefinic linkage in allyl position with respect to such ether oxygen atom. These preferred di-unsaturated ethers may or may not be symmetrical.

It has now been discovered that the above-defined class of unsaturated ethers, and particularly those in which each radical attached to the ether oxygen atom is a hydrocarbon radical attached to said ether oxygen atom by a methylene or methylidyne group and containing a single olefinic linkage in allyl position with respect to the ether oxygen atom, may be pyrolyzed to produce unsaturated carbonylic compounds (i. e., aldehydes or ketones, respectively) having the same carbon structure and configuration as that of the unsaturated radical of the treated ether. More specifically stated, the invention resides in subjecting these unsaturated ethers, in the vapor phase, to the action of heat whereby the ether structure is decomposed at the ether oxygen linkage to produce, inter alia, an unsaturated aldehyde or ketone, and an organic compound corresponding in its carbon structure to the other radical originally attached to the ether oxygen atom. The specific temperature which is to be employed for the thermal pyrolysis according to the present invention will vary depending on a number of factors. For example, the chemical structure of the unsaturated ether treated will affect the optimum operating temperature, it being found that some of the unsaturated ethers may be cleaved at an ether oxygen linkage with greater facility than others. Also, space velocity (which is the hourly volume of gas flowing through the apparatus per unit volume of reaction space, under standard conditions of temperature and pressure) will affect the selection of a desired or optimum temperature to be employed for the thermal pyrolysis of a given unsaturated ether according to the process of this invention. In this connection it is to be noted that the use of high space velocities allows pyrolysis at correspondingly higher operating temperatures because the residence time of the unsaturated ether in the reaction zone is correspondingly decreased, thereby inhibiting undesirable side reactions, such as decomposition of the produced unsaturated aldehydes or ketones, their polymerization, etc. Generally, the reaction temperature range to be employed for the pyrolysis of a given unsaturated ether of the defined class lies between about 300° C. and the temperature at which there occurs an excessive decomposition of the carbon structure of the obtained unsaturated carbonylic compound. In the case of thermal pyrolysis of diallyl ether or dimethallyl ether to produce acrolein or methacrolein, respectively, the economical operating temperature range is between about 500° C. and about 650° C., the preferred range being between about 550° C. and about 600° C. Higher and lower temperatures may be employed, particularly if the space velocity is correspondingly changed. However, when operating at about 600° C. or above, noticeable decomposition of the aldehyde and formation of carbon monoxide was observed, thus indicating that, at least insofar as the pyrolysis of diallyl and/or dimethallyl ethers is concerned, the desired upper operating temperature (for the specific space velocities employed) is in the neighborhood of this figure. For most unsaturated ethers of the defined class, the pyrolysis temperature may be stated to be between about 300° C. and the temperature at which substantial decomposition of the formed unsaturated carbonylic compound occurs, this upper temperature limit being generally in the neighborhood of 600° C.

Although the process of the present invention may be effected at subatmospheric pressures, it is preferable to execute the same at or above atmospheric pressure. Depending on whether a primary or secondary unsaturated ether is employed as the starting material, the pyrolysis of such an unsaturated ether of the defined class forms either a mixture containing an unsaturated aldehyde and a hydrocarbon or a mixture containing an unsaturated ketone and a hydrocarbon. For example, when diallyl ether is subjected to pyrolysis according to this invention, the vaporous reaction products, besides acrolein, also contain considerable amounts of propylene. Similarly, the effluent gases obtained by the thermal pyrolysis of dimethallyl ether contain both methacrolein and isobutylene. By employing somewhat superatmospheric pressures and a slightly longer residence time it is possible to obtain high yields of the aldehyde or ketone without resorting to higher temperatures. On the other hand, the advantage of such superatmospheric pressures resides in the relative facility of recovering both the obtained carbonylic compound and the hydrocarbon (propylene, isobutylene, or the like) from the effluent gases.

The pyrolysis of the unsaturated ethers according to the process of the present invention is preferably effected in the absence of any reaction promoting catalyst, a thermal treatment being sufficient to cleave the ether to produce the desired unsaturated carbonylic compound and an organic compound, such as a hydrocarbon. Since the cleavage according to the present process occurs predominantly at the bond between the ether oxygen atom and one of the radicals attached thereto, the organic compound thus formed as one of the products corresponds in structure and configuration to such radical originally attached to the ether oxygen atom. In the case of symmetrical primary di-unsaturated ethers, such as the symmetrical di-allyl type ethers (i. e., symmetrical unsaturated ethers in which each radical attached to the ether oxygen atom contains an olefinic linkage in allyl position with respect to the ether oxygen atom), the pyrolysis according to this invention will form an unsaturated aldehyde and an olefin, both of these organic substances having the structure and configuration of the radicals attached to the ether oxygen atom. As to unsymmetrical ethers, the place of cleavage will depend, at least in part, on the relative bonding strengths of the two radicals to the ether oxygen atom.

Although the pyrolysis may be effected in an empty reactor, such as a heated tube, it is preferable to use reactors which contain a heat-transferring material, such as quartz chips, pyrex glass chips, etc. The presence of such packing in the reactor improves the yield of the desired products since it permits the maintenance of a substantially uniform temperature throughout the reactor, and thus avoids localized overheating and, therefore, undesirable decomposition (cracking) of the produced aldehydes or ketones. Under some conditions it is possible to effect the reaction in the presence of substances of the type of brass turnings, silver gauze, and the like, which are known to possess high heat conducting characteristics. The use of such substances, therefore, will facilitate transfer of heat to the ethers to be pyrolyzed. However, as stated, the reaction may be generally effected in the absence of any heat conducting substances in the reaction zone.

For illustrative purposes only, reference will be made to the following examples which typify preferred methods of pyrolyzing the defined unsaturated ethers to produce unsaturated aldehydes. It is to be understood that the invention is not to be limited by these examples, since it is applicable to the pyrolysis of other primary unsaturated ethers to produce unsaturated aldehydes, as well as to the treatment of secondary unsaturated ethers to produce unsaturated ketones.

Example I

The apparatus employed consisted of a packed tube made of stainless steel and enclosed in a furnace heated by means of an open gas flame. The primary material before introduction into the heated tube was first vaporized in a preheater also made of stainless steel. The vaporous reaction products leaving the tube were passed through an ice-cooled reflux condenser, the condensate being withdrawn and collected in a trap cooled by means of alcohol and solid carbon-dioxide. The overhead gases which remained unliquefied after passage through the reflux condenser were collected over a saturated salt solution.

Dimethallyl ether (specific gravity $20/4°$ C.$=.0.815$)

was introduced into the system at the rate of .5 cubic centimeter per minute, the vapors evolved in the preheater being conveyed through the reaction tube which was maintained at a temperature ranging between about 500° C. and about 570° C. The run continued for a period of about 47 minutes during which time about 134 grams (1.06 mols) of dimethallyl ether were thus vaporized and subjected to pyrolysis at the above temperatures. The total volume of the exit gas from the reaction tube was equal to about 0.537 cu. ft. of which about 0.43 cu. ft. were liquefied in the reflux condenser. This liquid fraction was then fractionated and about 42.8 grams (0.61 mols) of methacrolein were recovered. The yield of this unsaturated aldehyde was thus equal to about 57% as calculated on the basis of the unsaturated ether treated.

Example II

In this case the reactor consisted of a pyrex glass tube filled with pyrex chips and heated in an electric furnace. Prior to passage through this reaction tube, the unsaturated ether was first vaporized in an aluminum preheater. The vaporous reaction products leaving the reaction tube were first passed through an ice trap and then through a vessel cooled by means of a mixture of alcohol and solid carbon-dioxide. All of the condensable gases were thus collected in this vessel.

Dimethallyl ether was introduced into the system at a rate which varied somewhat between about 2.5 cubic centimeters and 3.0 cubic centimeters per minute. The reaction temperature in the pyrex glass reactor was maintained at between about 580° C. and 600° C. The reaction was continued until about 130 grams (1.03 mols) of dimethallyl ether were thus treated. An analysis of the reaction products showed that about 43.3 grams (0.62 mol) of methacrolein were produced by the pyrolysis of the unsaturated ether. The yield was thus equal to about 60%.

Example III

Diallyl ether was passed at a rate of about 1065 grams per hour through a steel tube 60 centimeters long and 2 centimeters in diameter. This tube was packed with 6–10 mesh quartz chips and was maintained at a temperature of about 575° C. The yield of propylene obtained by pyrolysis was equal to about 95.4%. However, due to a certain amount of polymerization and/or decomposition occurring in the reactor, the actual yield of acrolein, as obtained from a fractional distillation of the condensed reaction products, was equal to about 86.5%, while the conversion was about 82.5% as calculated on the diallyl ether introduced.

Although the above examples have described the process with particular reference to the production of acrolein and methacrolein from diallyl and dimethallyl ethers, it is to be understood that other unsaturated symmetrical and/or unsymmetrical, primary or secondary ethers of the defined class, and particularly those having a methylene or a methylidyne group directly attached to the ether oxygen atom and an olefinic linkage in allyl position with respect to the carbon atom of such methylene or methylidyne group, may be employed as the primary material to produce, via pyrolysis (particularly non-catalytic pyrolysis) unsaturated aldehydes or ketones corresponding in structure and configuration to the unsaturated radical attached to the ether oxygen atom. Also, as stated, the preferred process consists in effecting the pyrolysis reaction non-catalytically and at elevated temperatures which, however, are below those at which substantial decomposition of the formed unsaturated carbonylic compounds occurs.

The pyrolysis of the ethers according to the process of this invention may also be effected in the presence of various inert diluents, such as nitrogen, steam, etc. In fact, the presence of such diluents may frequently be highly desirable since they inhibit decomposition of the unsaturated aldehydes or ketones at the high temperatures employed in the reaction zone in which the pyrolysis reaction is effected. Also, the use of aqueous solutions of the ethers may frequently be highly economical. This is because unsaturated ethers are commonly recovered from mixtures containing the same in the form of their azeotropes with water. These azeotropic mixtures may then be subjected to pyrolysis according to the present process without the necessity of first dehydrating such mixtures.

I claim as my invention:

1. In a process of producing acrolein, the steps of subjecting diallyl ether to thermal non-catalytic pyrolysis at a temperature of between about 550° C. and about 600° C., and recovering acrolein from the reaction products.

2. In a process of producing methacrolein, the steps of subjecting dimethallyl ether to thermal, non-catalytic pyrolysis at a temperature of between about 500° C. and about 600° C., and recovering methacrolein from the reaction products.

3. In a process of producing acrolein, the steps of vaporizing diallyl ether, subjecting the ether vapor to thermal non-catalytic pyrolysis at a temperature of between about 300° C. and about 600° C., and recovering the acrolein from the reaction products.

4. In a process of producing methacrolein, the steps of vaporizing dimethallyl ether, subjecting the ether vapor to thermal non-catalytic pyrolysis at a temperature of between about 300° C. and about 600° C., and recovering the methacrolein from the reaction products.

5. In a process of producing unsaturated aldehydes, the steps of vaporizing a symmetrical unsaturated ether wherein each radical is attached to the ether oxygen atom by means of a methylene radical and contains an olefinic linkage in allyl position with respect to the ether oxygen atom, subjecting the vapors thus formed to thermal non-catalytic pyrolysis at an elevated temperature of between about 300° C. and about 600° C., and recovering the unsaturated aldehyde thus produced.

6. In a process of producing unsaturated aldehydes, the steps of vaporizing an ether wherein each radical is attached to the ether oxygen atom by means of a methylene group and wherein each of said radicals contains an olefinic linkage in allyl position with respect to the ether oxygen atom, subjecting the vapors thus produced to thermal non-catalytic pyrolysis at a temperature of between about 300° C. and about 600° C., and recovering the allyl-type unsaturated aldehyde thus formed.

7. The process according to claim 6, wherein the reaction is effected in the presence of an inert diluent.

8. In a process of producing unsaturated aldehydes, the step of subjecting vapors of an ether wherein at least one of the radicals is attached to the ether oxygen atom by means of a methylene group and wherein said radical contains an olefinic linkage in allyl position with respect to the ether oxygen atom, said ether being free from any double and triple bonds in vinyl position with respect to said oxygen atom, to thermal non-catalytic pyrolysis at a temperature of between about 300° C. and tht temperature at which substantial decomposition of the obtained unsaturated aldehyde occurs.

9. In a process of producing unsaturated aldehydes, the step of subjecting vapors of a symmetrical unsaturated ether wherein each radical is attached to the ether oxygen atom by means of a methylene group and contains an olefinic linkage, to thermal non-catalytic pyrolysis at a temperature of between about 300° C. and the temperature at which substantial decomposition of the obtained unsaturated aldehyde occurs.

10. In a process of producing unsaturated aldehydes, the step of subjecting vapors of an ether wherein each radical is attached to the ether oxygen atom by means of a methylene group and contains an olefinic linkage, to thermal pyrolysis at a temperature of between about 300° C. and the temperature at which substantial decomposition of the obtained unsaturated aldehyde occurs.

11. In a process of producing unsaturated aldehydes, the step of subjecting vapors of an ether having at least one unsaturated radical attached to the ether oxygen atom by means of a methylene group, said ether being free from any double and triple bonds in vinyl position with respect to the ether oxygen atom, to thermal pyrolysis at a temperature of between about 300° C. and the temperature at which substantial decomposition of the obtained unsaturated aldehyde occurs.

12. In a process of producing unsaturated carbonylic compounds, the step of subjecting the vapors of a symmetrical unsaturated ether selected from the class consisting of unsaturated primary and secondary ethers containing an olefinic linkage in non-vinyl position with respect to the ether oxygen atom, to thermal non-catalytic pyrolysis at a temperature of between about 300° C. and the temperature at which substantial decomposition of the obtained unsaturated carbonylic compound occurs.

13. In a process of producing unsaturated carbonylic compounds, the step of pyrolyzing an unsaturated ether selected from the class consisting of unsaturated primary and secondary ethers containing an olefinic linkage in non-vinyl position with respect to the ether oxygen atom, in the vapor state and at a temperature of between about 300° C. and the temperature at which substantial decomposition of the obtained unsaturated carbonylic compound occurs.

WILLARD B. CONVERSE.